Patented May 22, 1945

2,376,327

UNITED STATES PATENT OFFICE 2,376,327

DEMOTHING PRODUCT

Faw Yap Chuck, San Francisco, Calif., assignor to Lindauer and Co., San Francisco, Calif., a copartnership consisting of Earl Marioni and Arthur G. Lindauer No Drawing. Application October 21, 1940
Serial No. 362,093

1 Claim. (Cl. 167—37.)

This invention relates generally to products suitable for demothing closets or like spaces in which clothes or other goods are being stored, and to methods for their manufacture. More particularly, it relates to a product which can be placed within a closet or like confined space, and which will maintain an atmosphere lethal to moths, and moth larvae and eggs.

It is an object of the invention to provide a product of the above character capable of maintaining a lethal atmosphere over a relatively long period of time. In this connection, the invention differs from products now available on the market, containing volatile lethal materials within a container, and which are characterized by a relatively short period of effectiveness, after which a lethal atmosphere is no longer maintained.

A further object of the invention is to provide a demothing product having certain desirable properties of cedar wood, including a pronounced cedar odor, together with properties making it more effective than cedar wood in maintaining a lethal atmosphere.

Further objects of the invention will appear from the following description in which the preferred embodiments have been set forth in detail.

The present invention makes use of certain highly volatile materials which are known to be effective in maintaining an atmosphere lethal to moths. However, too rapid evaporation of the active ingredients is prevented by having the ingredients absorbed in a porous absorbent medium. This medium is preferably fragments of cedar wood, and the natural odor and other volatile constituents of the cedar wood which are known to be desirable for demothing and deodorization are enhanced by the presence of one or more ingredients serving to aid hydrolysis.

As stated above, the porous absorbent medium employed is preferably cedar wood such as cedar sawdust or cedar chips. The material employed to impregnate the cedar wood contains one or more highly volatile materials capable of producing an atmosphere lethal to moths, and also their eggs and larvae. Among active ingredients of this type which are known to be effective to maintain the desired lethal atmosphere, I can make reference to paradichlorobenzene, ethylene dichloride, camphor, and trichlorobenzene.

In addition to lethal ingredients which are highly volatile, I preferably include a lethal material capable of killing by contact, such as pyrethrum extract. As materials capable of inhibiting too rapid volatilization of the volatile lethal ingredients, I make use of a suitable glycol such as glycerin. In addition, relatively slow drying solvents can be used, such as carbitol or deodorized kerosene which serve as a solvent for certain of the ingredients.

For the purpose of enhancing the natural desirable odor of cedar wood, I prefer to introduce cedar oil, and in addition I provide for a moisture content in the final product which is in excess of the average natural moisture content of cedar wood sawdust. This result is also accomplished by the presence of a glycol, like glycerine, and also by introducing water into the product as it is being manufactured.

As a specific example for practicing the present invention, a solution is prepared as follows:

| | | |
|---|---|---|
| Cedar oil | pound | 5 |
| Paradichlorobenzene | do | 10 |
| Ethylene dichloride | gallons | 1 |
| Pyrethrum extract (in kerosene) | do | ½ |

A mixture of the above ingredients is diluted by addition of carbitol to make about 6 gallons liquid material.

A second solution is prepared consisting of equal parts of glycerin and water, and this second solution is then added to the first solution to form a temporary emulsion. Equal quantities of the first and second solutions can be used.

The emulsion formed as described above is intermixed with cedar sawdust to cause the sawdust to absorb the liquid material. In practice, about one gallon of the emulsion will suffice to impregnate about 300 to 400 pounds of sawdust. After thoroughly intermixing the liquid with the sawdust, the material is agitated in a suitable mill, so that the liquid ingredients are homogenously distributed and absorbed by the wood fiber.

The resulting product can be packed in cartons for distribution to the trade. A convenient carton consists of a cloth bag which is sealed by an outer bag of moistureproof Cellophane. To use such a bag for demothing a closet, one removes the moistureproof Cellophane cover and then the bag is placed within the closet. Volatilization of the paradichlorobenzene and ethylene dichloride serves to maintain an atmosphere within the closet which is lethal to moths and also to moth larvae and eggs. At the same time, the natural aromatic and volatile ingredients of the cedar wood are effective for the same purpose, and also as a deodorizer. In this connection, the more powerful lethal ingredients, namely the paradichlorobenzene and ethylene dichloride do not mask over the pleasant and desirable cedar odor.

The fact that the volatile lethal materials are absorbed in the fiber of the cedar wood tends to reduce the rate of volatilization. In addition, the rate of volatilization is minimized by the presence of carbitol or like hydrocarbon solvent.

The glycerin content serves a dual purpose. It also tends to reduce the rate of volatilization of the paradichlorobenzene and ethylene dichloride, and in addition it aids in maintaining a water content in the cedar wood such as promotes the evolution of the natural desirable volatile constituents of cedar wood. In this connection, I have simply impregnated cedar wood sawdust with a solution of glycerin and water, with the result that the cedar odor of the wood is greatly enhanced, and the natural volatile constituents of the wood which are known to be effective in demothing are evolved far more effectively, and their evolution maintained over a relatively long period of time. I attribute this to a hydrolyzing action which promotes the volatilization or evolution of aromatic ingredients of the wood. In place of glycerin, I can make use of other glycols, such as propylene or ethylene glycol, or mixtures of glycols. However, glycerin has given best results. In addition to its functions described above, glycerin has a sweetish odor, tending to attract moths and other insects. When a moth comes into direct contact with the product, it is killed by the lethal ingredients, particularly by the pyrethrum extract.

I claim:

As a new article of manufacture, fragments of cedar wood impregnated with a solution containing paradichlorobenzene, ethylene dichloride, a hydrocarbon solvent, and glycerin, the glycerin component of said solution being sufficient to reduce the volatilization of the paradichlorobenzene and ethylene dichloride and to promote the volatilization of the natural volatile constituents of the cedar wood.

FAW YAP CHUCK.